United States Patent
Clark

[11] 3,800,139
[45] Mar. 26, 1974

[54] DIGITAL SPEED CONTROL APPARATUS FOR VEHICLES

[75] Inventor: Thomas D. Clark, Monroeville, Pa.

[73] Assignee: Westinghouse Air Brake Company, Swissvale, Pa.

[22] Filed: July 3, 1972

[21] Appl. No.: 268,663

[52] U.S. Cl......... 246/182 C, 317/5, 340/146.1 BE
[51] Int. Cl............................................... B60l 15/00
[58] Field of Search........ 246/182 R, 182 C, 187 R, 246/187 B; 317/5; 340/172.5, 146.1 BE; 180/105 E

[56] References Cited
UNITED STATES PATENTS

| | | | |
|---|---|---|---|
| 3,312,818 | 4/1967 | Staples | 246/182 C |
| 3,482,090 | 12/1969 | Wilcox | 246/182 C |
| 3,599,154 | 8/1971 | Carol et al. | 317/5 |
| 2,950,464 | 8/1960 | Hinton et al. | 340/146.1 BE |
| 3,639,753 | 2/1972 | Reich | 246/182 C |
| 3,626,177 | 12/1971 | Franke | 246/1 R |

Primary Examiner—Gerald M. Forlenza
Assistant Examiner—George H. Libman
Attorney, Agent, or Firm—A. G. Williamson, Jr.; H. A. Williamson

[57] ABSTRACT

An allowed speed signal received from an off-vehicle source and an actual speed signal generated on-board are each converted from their original form to a signal having a relatively high frequency proportional to the represented speed. Each conversion is dual channel to produce two outputs, for the same signal, which are compared in digital cycle checking apparatus for identical frequencies to assure the validity of the frequency conversion and thus the speed signals. One frequency signal from each pair is compared in another digital cycle checking apparatus to determine if an over or under train speed condition exists. Each cycle checking means periodically simulates an improper comparison, after which the correct condition must be detected to provide a continued output. Thus the validity of the cycle check operations is assured. Each of the frequency pairs must check equal and a train underspeed condition detected to produce the complete set of output signals which allow train movement to continue.

8 Claims, 5 Drawing Figures

DIGITAL SPEED CONTROL APPARATUS FOR VEHICLES

BACKGROUND OF THE INVENTION

My invention pertains to speed control apparatus for vehicles including railroad trains. More specifically, the invention pertains to speed control apparatus in which allowed and actual speed indications are converted into signal forms which may be compared in a digital manner in order to determine the necessary movement controls for the train or vehicle.

The majority of the prior art cab signal or speed control systems, especially for railroad trains including rapid transit vehicles, employ analog apparatus in decoding, generating, and comparing allowed and actual train speed signals. In the well-known coded cab signal or train control systems, analog type decoders selectively energize relays in accordance with the received code signal representing allowed speed. These relays in turn selectively activate or select various low pass filters associated with actual train speed signals. Such filter output decreases as train speed reaches the designated speed for the selected filter. An overspeed condition then so decreases the filter output that it releases a brake and/or propulsion control relay and the train speed is automatically decreased or the train halted by an automatic brake application. Problems, however, are created as components in the various parts of the apparatus age and calibration and/or accuracy thus suffers. Temperature variances also affect the calibration of such tuned filters and associated apparatus. Where relays are used, the requirement that they be of a vital type necessary for fail-safe train control increases the overall cost of the apparatus. A more accurate and cheaper system or apparatus will result if digital decoding and comparing apparatus is used to determine overspeed conditions on the train. Such apparatus will reduce the complexity of the control circuitry and eliminate much apparatus which is subject to calibration variances due to age and temperature changes.

Accordingly, an object of my invention is a digital type speed control apparatus for vehicles.

Another object of the invention is an improved speed control system for vehicles or cars moving along a fixed guideway.

A further object of the invention is an improved speed control apparatus for vehicles including railroad trains in which converted high frequency signals designating permitted and measured speeds are digitally compared for validity and overspeed conditions to control propulsion or continued movement of the vehicle or train.

Still another object of the invention is speed control apparatus for vehicles in which the allowed and actual speed indications are converted to signal frequencies proportional to the speed represented and then compared in a digital manner to determine overspeed conditions.

Still another object of the invention is digital speed control apparatus for vehicles in which the validity of conversion of the original speed indications into speed proportional frequency signals for digital comparison is checked by comparing the frequency of signals produced by dual conversion channels.

It is also an object of my invention to provide an improved speed control system for railroad trains including dual conversion of allowed and actual speed indications registered on the train into speed proportional frequency signals, checking the validity of each pair of frequency signals, comparing one frequency signal of each pair for overspeed conditions, and controlling the propulsion and braking apparatus of the train in accordance with the conversion validity checks and the overspeed comparisons.

Other objects, features, and advantages of my invention will become apparent from the following specification when taken in connection with the accompanying drawings and the appended claims.

SUMMARY OF THE INVENTION

In practicing the invention, I provide on the vehicle apparatus to receive and register the allowed or desired speed indication signal and separate apparatus to generate an indication of the actual vehicular speed. Each of these signals is then converted or modified into a high frequency signal proportional to the speed which it represents. That is, as specifically shown, a code rate frequency received on-board the vehicle from an external control source and representing the allowed vehicle speed is converted into an allowed speed frequency which is proportional to the maximum speed that the vehicle or train is permitted to travel at that particular time. At the same time, other apparatus on the train generates an oscillating signal from a pickup device which is a measure of the actual vehicle speed. This signal is compensated for the existing wheel wear condition and then converted into a second frequency proportional to train speed. Each of the frequency converter means is a dual channel arrangement which simultaneously and identically converts the input code or low rate frequency to a pair of signals having a higher frequency proportional to the corresponding speed signal, whether allowed or actual speed. These dual conversion channels allow a validity check comparison of the converted frequency signals to assure that the frequency conversion apparatus is properly operating. To accomplish this, each corresponding pair of frequency outputs is applied to a cycle check controller apparatus which includes a logic network of AND and OR gates and a reversible counter element. These controllers compare the two inputs to determine if they are identical and provide an output signal only when both inputs are of the same frequency. This output, which has an alternating current form, is converted to a direct current holding energy for a check relay. Such checking apparatus and relay is provided for each dual frequency conversion, that is, for the actual train speed and the allowed speed frequency conversion.

At the same time, one output of each frequency converter is applied to another cycle or speed check controller for the determination of possible overspeed conditions. Again, the internal circuitry includes various logic elements, AND gates, multivibrator one-shot components, and a reversible digital counter. The two frequency inputs are compared and an output alternating current supplied only if the actual train speed is determined to be less than the allowed train speed. This holds energized and underspeed relay similar to the check relay of the other cycle check controllers. In each of the cycle check controllers, the comparison is an active operation in which improper frequency relationships are periodically simulated and the apparatus then allowed to again detect the existence of the proper conditions in order to continue to produce an output. The final piece of apparatus is a propulsion control device which is specifically shown as a brake control relay or magnet which is held in an energized position equivalent to the brake release condition hen each of the check relays and the underspeed relay remain energized. The release of this brake control relay or valve magnet actuates a vehicle braking condition which will obviously occur if an overspeed condition occurs or if the validity of the frequency conversion in either dual channel converting apparatus becomes questionable. If the holding circuit for the brake control relay is interrupted by any of these improper conditions, an automatic braking operation is actuated to either reduce the speed of the vehicle below the allowed speed or to stop the vehicle.

DESCRIPTION OF THE DRAWINGS

Prior to pointing out the scope of the invention in the appended claims, a better understanding of the apparatus is provided in the following detailed description where reference is made to the accompanying drawings in which:

Illustrated in FIG. 3 is a schematic block diagram of the complete two-channel frequency conversion apparatus for the actual train speed signal, usable in the FIG. 1 arrangement.

Illustrated in FIG. 5 is another schematic logic diagram of apparatus preferred for use as each cycle check controller of the FIG. 1 arrangement for determining that identical frequencies have been developed in each channel of the associated frequency converter apparatus.

In each of the drawings, similar reference characters are used to designate similar parts of the apparatus.

DESCRIPTION OF THE PREFERRED EMBODIMENT

Figure 1:
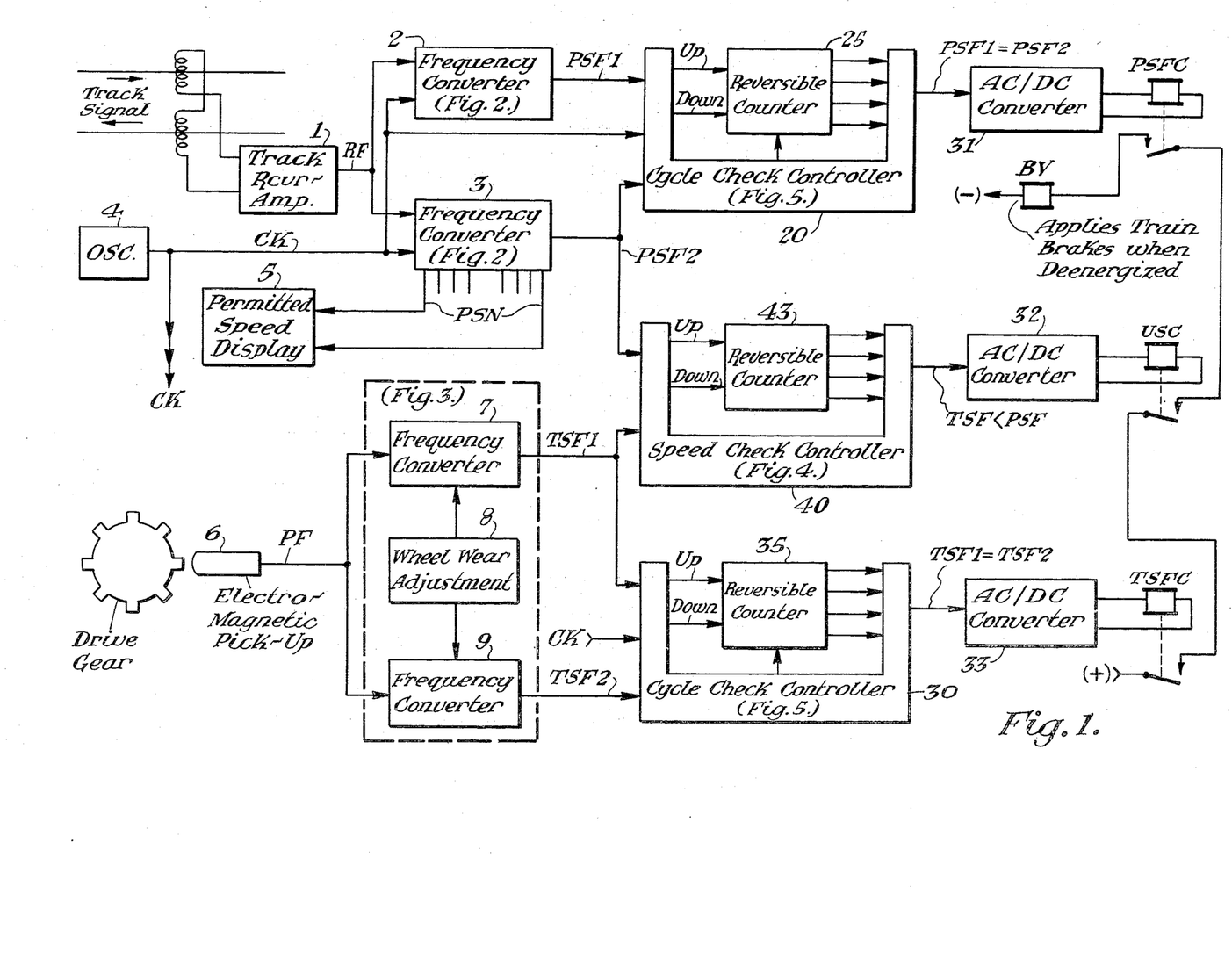
FIG. 1 is a block diagram of digital train speed control apparatus embodying the preferred arrangement of my invention.

The block diagram of FIG. 1 illustrates in a conventional manner, without specific details, an apparatus arrangement for speed control specifically designated for railroad trains including rapid transit operation. It is to be understood that, broadly, the invention is not limited only to an application for train speed control but is adaptable to other types of vehicles moving along roadways other than railroad tracks. In the upper left of FIG. 1 is shown a short portion of the track on which the train moves. This is a conventional two-line symbol, one line for each rail of the track. The cab signal or speed control signal transmitted through the track to establish the allowed maximum speed is illustrated by the two arrows facing in opposite directions, designated as the track signal. These represent an instantaneous current flow of the alternating current carrying as a modulation frequency the cab or speed signal.

Mounted on the leading end of the train, in inductive relationship with the rails, are two pickup or receiver coils, one over each rail, which are illustrated by conventional symbols for such coils. These two coils are connected in series so that the induced voltage signals therein are combined or added before being supplied to the track receiver-amplifier shown by the conventional block designated by the reference 1. Such apparatus arrangements and operation are well known in the prior art. It is further assumed here that the track signals include an alternating current carrier modulated with a code rate which may be of a frequency on the order of 1.25 to 6 Hz. This receiver-amplifier receives and demodulates the carrier current and supplies a pulsed signal output RF at the received code rate. This is a square wave pulse output produced within the track receiver-amplifier unit 1. Obviously, other forms of modulation of the track current carrier may be used and track receiver-amplifier units designed to receive and demodulate such other type signals may be used, under which conditions the output signal RF may have a different wave shape but still at a relatively low frequency.

The output of the receiver-amplifier 1 is applied to two different frequency converters, designated by the blocks 2 and 3. These identical frequency converters will be described in more detail shortly, but very briefly they provide dual channels for converting the allowable speed signal into a higher frequency signal. In other words, the relatively low code rate or frequency signal output of the track receiver-amplifier is transformed in each of the frequency converters into a relatively high frequency proportional to the speed variously designated herein as the permitted, allowed, or desired speed of the vehicle or train. The basic source from which the high frequency is produced is an oscillator, designated by the block 4, which provides a frequency output CK. This oscillator is shown as a conventional block and is not further described in detail since such oscillators are well known in the art. It may be a crystal controlled oscillator apparatus or any other which will provide an accurate and controlled frequency signal output. Each frequency converter, when supplied with both inputs RF and CK, produces an output frequency proportional to the permitted or allowed speed of the vehicle. That is, frequency converters 2 and 3 each provide an output, designated as PSF1 and PSF2, respectively, which is a signal having a frequency proportional to the maximum allowed speed of the train at that particular instant. It will be noted that the frequency converter 3 also supplies an output designated as the permitted speed Number PSN, which is a binary signal applied to the permitted speed display device 5 wherein a visual display of the allowed speed is provided. This arrangement will be described in more detail shortly.

The outputs from converters 2 and 3 are applied to a cycle check controller 20 which is interconnected with a reversible counter 25. The cycle check controller also receives an input CK from oscillator 4. This cycle check controller includes various logic circuitry and elements, to be described in detail later, which, with interconnected reversible counter 25, provide an output signal to an AC/DC converter 31 only when the two input frequencies are identical. The output is represented by the designation on the output line that, for the output to exist, PSF1=PSF2. The AC/DC converter 31 supplies a d.c. output voltage to hold energized a permitted speed frequency check relay PSFC which, when so energized, holds its single front contact closed. It is emphasized that the cycle check controller 20 provides an output only when the two input frequency signals are identical in frequency. Thus, controller 20 checks the redundant or two-channel conversion of the allowed speed signal into the higher frequency signal to assure the validity of the frequency conversion and thus the validity of the allowed speed frequency signal which will be used in the over or under speed checking arrangement. Each AC/DC converter is shown only by a conventional block since any one of several known types of such converters may be used. For example, each may be a simple full wave rectifier if no amplification is needed.

Another pair of frequency converters 7 and 9 provide a dual channel for converting the actual speed signal into a frequency proportional to that speed and adjusted for the wear of the car wheels. Frequency converters 7 and 9 have a common input PF from an electromagnetic pickup or sensing device 6 which is mounted adjacent to a driving gear on one of the axles of the train. A pulse is generated when each gear tooth passes the pickup device and thus the signal PF is an alternating current whose frequency represents the train speed. As mentioned, this signal PF is applied as an input to each of the frequency converters 7 and 9 which also have an input from the wheel wear adjustment apparatus 8. This latter apparatus provides an adjustment as the train wheels wear between permissible maximum and minimum limits so that the output of the frequency converters will be an accurate indication of the actual train speed. The details of the frequency converters and the wheel wear adjustment, as indicated by the dashed block surrounding these units, will be described in connection with FIG. 3.

The frequency outputs of these two converters, designated as signals TSF1 and TSF2, are proportional to the actual train speed and are applied simultaneously to a cycle check controller 30 which is similar to the device 20 previously mentioned. Controller 30 is interconnected with a reversible counter 35 and also receives an input CK from oscillator 4. Similar to controller 20, cycle check controller 30 provides an output only when the two inputs TSF1 and TSF2 have identical frequencies, as indicated by the symbol TSF1=TSF2 associated with the output line from controller 30. This alternating output signal is applied to an AC/DC converter 33 which, when a signal is received, provides an output voltage for energizing the train speed frequency check relay TSFC. This relay, when energized, holds closed its single illustrated front contact. The energization of this relay is thus an indication that the actual train speed signal is valid since the two-channel conversion provides equal or identical frequency outputs.

The outputs from the frequency converters 3 and 7, signals PSF2 and TSF1, respectively, are applied to a third unit, the speed check controller 40 which is in turn interconnected with the reversible counter 43. This speed check controller is slightly different in internal circuitry from the two previously mentioned controllers and compares the allowed and actual speed frequency signals to provide an output only when the train speed is detected as being less than the permitted or allowed speed. This condition is indicated by the symbol TSF<PSF associated with the output line of controller 40. Controller 40 provides this output signal to an AC/DC converter 32 which, when a signal is received, provides an output voltage for holding energized the underspeed check relay USC. Like the other check relays, relay USC holds its single front contact closed as long as the relay winding is energized.

The system is thus conditioned internally to deliver oscillating or alternating current signals to the AC/DC converters 31 and 33 when the frequencies representing the allowed and actual train speeds are generated correctly. Further, an oscillating signal is delivered to AC/DC converter 32 when the train speed signal is of lower frequency that the allowed speed signal. Under these conditions, a circuit is completed from the positive terminal of a direct current source through the closed front contacts of relays TSFC, USC, and PSFC to a brake valve magnet BV, and thence to the negative terminal of the direct current source. In order to simplify the understanding of the propulsion control concept, the brake valve magnet is shown as being similar to a relay winding which, when it becomes deenergized, actuates the application of the train brakes. Although this may be an oversimplified illustration of the control of the propulsion of the train, it accurately indicates the desired result of the speed control apparatus. That is, as long as the allowed and actual train speed signals are properly generated and an underspeed condition exists, brake valve magnet BV is held energized and the train brakes are held released. If an overspeed condition occurs, i.e., TSF>PSF, so that relay USC releases, or either pair of the speed proportional frequencies is incorrectly generated so that the corresponding check relay releases, brake valve magnet BV is deenergized and, upon release, causes an application of the train brakes to automatically reduce the train speed. In other words, if any one of the three safety check conditions does not exist, brake valve magnet BV is deenergized and releases to apply the train brakes for an automatic brake application. Obviously, as desired, more sophisticated control of the train propulsion may be provided through similar check circuit arrangements.

I shall now describe the internal details and the operation of several of the unique elements covered only broadly in describing FIG. 1. However, in the remaining figures, conventional blocks are also used to designate the various subelements since each comprises conventional, well-known solid state or logic circuitry and the specific internal circuitry used will depend upon the specific requirements of the particular installation. These specific circuit elements will be selected during the engineering design phase of any particular speed control system.

Figure 2:
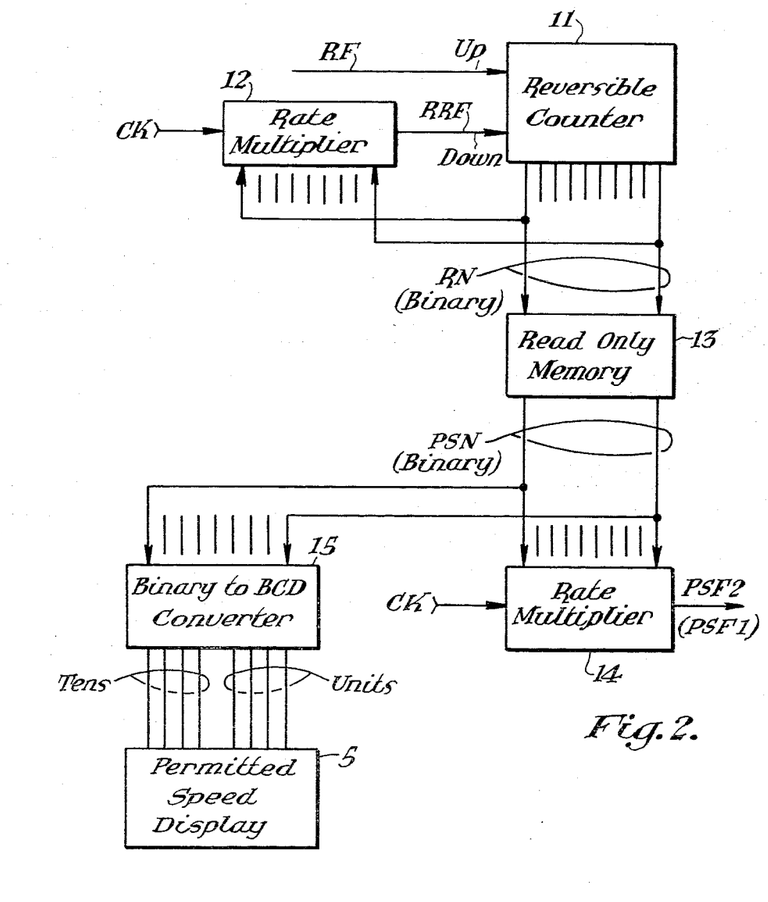
FIG. 2 is a schematic block diagram of one channel of the frequency converter for the allowed speed indication usable in the FIG. 1 arrangement.

The detailed block diagram of the frequency converter 3 is shown in FIG. 2. Except for the additional components 5 and 15 in order to provide a permitted speed display in the operating cab of the vehicle, FIG. 2 also illustrates the details of frequency converter 2 of FIG. 1. The frequency converter circuit functions to recognize the modulation or code rate frequency RF of the cab or allowed speed signal received from the rails and generates a permitted speed signal PSF whose frequency varies in accordance with the code rate frequency. In other words, the converter circuitry converts a relatively low rate frequency to a relatively high frequency which is directly proportional to the allowed speed for the vehicle. The rate is determined by a reversible counter 11 and a rate multiplier 12 which operate in a feedback loop. The counter accepts oscillating signals from both the multiplier and the receiver-amplifier while the multiplier accepts a number from the counter and a frequency signal CK from oscillator 4. The rate multiplier 12 produces a signal whose frequency is a fraction of the input signal frequency CK. The denominator of the fraction is fixed, for example, at a multiple of 64, by design, while the numerator is accepted in binary form by the rate multiplier from reversible counter 11.

When a track signal is received, the square wave pulses representing the code rate frequency RF begin to increment in counter 11. The rate number RN outputed by counter 11 is delivered to the numerator inputs on multiplier 12. The multiplier recognizes the number, combines it with a fixed denominator, multiplies the oscillator signal CK by the resulting fraction, and delivers a reconstructed rate frequency RRF to the down input on counter 11. At this time the counter is receiving more count up pulses RF than count down pulses RRF. Thus the count RN continues to increase and rate multiplier 12 delivers pulses whose frequency continues to increase. In a short time the frequency of the pulses appearing at the count down input equals the frequency of the pulses appearing at the count up input and the RN output of the counter then varies only slightly. Consequently, the frequency RRF delivered by rate multiplier 12 ceases its rapid rate of increase. Both counter 11 and multiplier 12 outputs stabilize to within a small range of numbers and frequencies, respectively. The rate multiplier reconstructs the rate frequency and the counter delivers to the Read Only Memory 13 a binary number equal to the rate.

Read Only Memory 13 accepts input RN from counter 11, internally decodes the data, and is programmed to deliver the allowed speed in binary notation on its output lines, designated as the permitted speed number PSN. Read Only Memory 13 outputs a speed command only when a valid rate is being decoded. Otherwise, it delivers logic 0's which represents a zero miles per hour speed command. Rate multiplier 14 accepts the binary representation PSN of the permitted speed at its numerator inputs, internally develops a fraction which is multiplied by another input CK from oscillator 4, and delivers a permitted or allowed speed frequency PSF2 to cycle check controllers 20 and 40, as shown in FIG. 1. The Binary to BCD Converter 15 also accepts the binary number PSN representing the permitted speed and converts it into a BCD code for a two-digit, allowed speed display on the control panel of the vehicle. This permitted speed display block is designated by the reference 5 since it is the same as the correspondingly designated block in FIG. 1. While only the RF to PSF2 frequency converter 3 is specifically illustrated in FIG. 2, it will be appreciated that the frequency converter 2, which provides output signal PSF1, is nearly identical, differing only in that it does not require a Binary to BCD Converter 15 for a speed display output.

Figure 3:
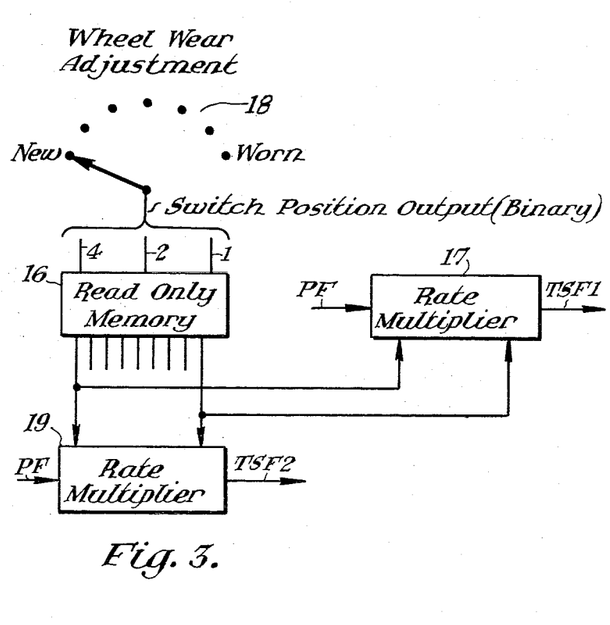

Referring now to FIG. 3, the details are shown of the dashed block in FIG. 1 which includes frequency converters 7 and 9 and wheel wear adjustment 8. Referring first to the wheel wear adjustment device, it comprises an adjusting switch 18 and a Read Only Memory 16. The circuit functions to compensate electrically for a wheel whose diameter becomes smaller through wear causing a proportional increase in the output frequency PF provided by the electromagnetic pickup device 6, shown in the lower left of FIG. 1. The entire range of the allowed wheel diameters is divided into a selected number of equal categories, here shown as seven. Each category is assigned a position on the rotary switch 18 and produces a binary output which is delivered to Read Only Memory device 16, as indicated schematically in the upper portion of FIG. 3. This binary number input addresses the Read Only Memory unit which in turn is programmed to deliver specific binary numbers to each of the rate multipliers 17 and 19, one being provided, respectively, for frequency converter 7 and frequency converter 9. These input numbers are treated by each rate multiplier as the numerator of a fraction which has a fixed denominator. The numerator decreases as switch 18 is turned from a particular position to a smaller diameter position. The denominator by design is set, for example, at a multiple of 64, and is dependent upon the number of rate multiplier packages used within each multiplier circuit element. Each rate multiplier accepts an input frequency PF from pickup device 6, multiplies it by progressively smaller fractions as the wheel wears, and outputs a train speed signal TSF1 or TSF2, respectively, which is then applied in a selected pattern to the various cycle/speed check controllers of FIG. 1. Specifically, output signal TSF1, representing the actual train speed, is applied to check controllers 40 and 30 in FIG. 1, while output signal TSF2 from rate multiplier 19 is applied only to cycle check controller 30.

Figure 4:
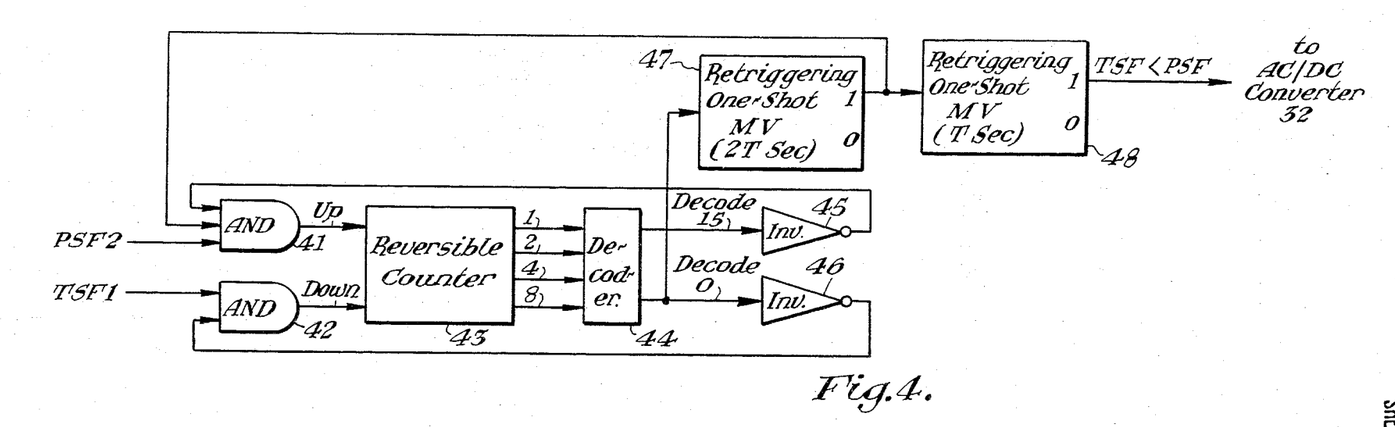
FIG. 4 is a schematic logic diagram of a speed check controller for comparing the frequency signals representing allowed and actual vehicle speeds to determine if an overspeed condition exists, which controller apparatus is the preferred arrangement for use in the overall apparatus of FIG. 1.

The detailed block diagram of the speed check controller 40, which compares the allowed speed frequency PSF and the actual speed frequency TSF, is shown in FIG. 4. The circuit arrangement functions to recognize whether the actual speed signal is lower in frequency than the allowed speed signal and indicates this condition by providing an oscillating signal output to the AC/DC converter 32. In order to prove the validity of the comparison and proper operation of the circuitry, the oscillating output is created, other conditions being proper, only when a periodic check ensures that the circuit arrangement can actually detect when train speed is simulated higher than the allowed speed. A four-stage reversible counter 43 receives inputs from AND gates 41 and 42 and develops an output number in binary notation from 0 through 15. A decoder unit 44 accepts as inputs these signals from the counter, determines when the number is 15 or 0, and indicates the detection of these two count limits by outputing positive going signal levels to the inverters 45 and 46, respectively. Inverter 45 outputs a signal to block AND gate 41 from passing the allowed speed frequency PSF2 after counter 43 has reached a count of 15. Similarly, inverter 46 blocks AND gate 42 from passing the actual speed frequency TSF1 after counter 43 has reached the count 0. A retriggering one-shot multivibrator 47 also receives the 0 count detecting signal and delivers an output pulse, designated as having a duration of 2T seconds, to AND gate 41 and also to a second retriggering one-shot multivibrator 48. The second one-shot multivibrator 48 in turn develops an output pulse of T second duration which is actually an indication, as designated, that frequency TSF is less than frequency PSF. The duration of the output pulses from each multivibrator, of course, will be specifically selected as a part of the engineering design of a particular installation, the designations here being for the purpose of indicating that the output from unit 47 is of twice the duration as the output from unit 48.

When an underspeed condition exists, one-shot unit 47, while nonactivated, prevents AND gate 41 from passing the allowed speed signal to the count up input on counter 43. If this counter is not in its 0 count state, inverter 46 allows AND gate 42 to pass the actual speed frequency signal to the count down input on the counter. Compared to a T second interval, counter 43 is rapidly decremented. When the 0 state is reached, decoder 44 delivers a signal to inverter 46 which in turn outputs a signal that blocks AND gate 42 and thus the count down input to counter 43. This 0 state output from decoder 44 also activates or fires one-shot unit 47 for a period of 2T seconds. The 1 state output signal from multivibrator 47 activates or fires one-shot unit 48 for T seconds and also enables AND gate 41 to pass the allowed speed frequency signal to the count up input of counter 43. With this input, counter 43 steps up, away from its 0 state. Since a 0 count is no longer detected, the removal of the input signal to inverter 46 again enables AND gate 42 to pass train speed frequency pulses to decrement the counter. However, since an underspeed condition exists, the count will be increasing faster than it will be decreased. If counter 43 reaches a 15 count during the next 2T seconds, inverter 45 prevents AND gate 41 from passing any more count up pulses. The count will thus stay at 15 although possibly decremented occasionally to 14. In any event, as long as the count does not return to 0, one-shot unit 47 will not be retriggered. At the end of the period of 2T seconds, the count up input is disabled due to the removal of the output signal from unit 47 from the one input to AND gate 41, and the train speed pulses rapidly decrement the counter. When count 0 is again reached, both one-shot units are triggered and the cycle repeats. Every 2T seconds, the circuit allows the counter to count more train speed pulses than allowed speed pulses. If the circuit detects the simulated overspeed condition, one-shot unit 48 is allowed to produce the output square wave signal TSF<PSF by producing a pulse of T second duration approximately every 2T seconds.

If train speed actually exceeds the allowed speed, the counter is decremented faster than it is incremented. A 0 count will be detected which retriggers one-shot unit 47 which allows the counter to continuously monitor the frequency of the allowed speed signal PSF. Every time the counter is incremented to 1 by the allowed speed signal, it will be decremented back to 0 by the faster train speed signal TSF and one-shot unit 47 will be retriggered. The output one-shot unit 48 is not triggered due to the continuous high level signal passed from the 1 output of one-shot unit 47. The circuit will also detect the loss of train speed pulses. If the counter cannot be decremented to 0, one-shot unit 47 is not triggered and, consequently, one-shot unit 48 also is not triggered and its oscillating output signal TSF<PSF will not be produced.

Figure 5:
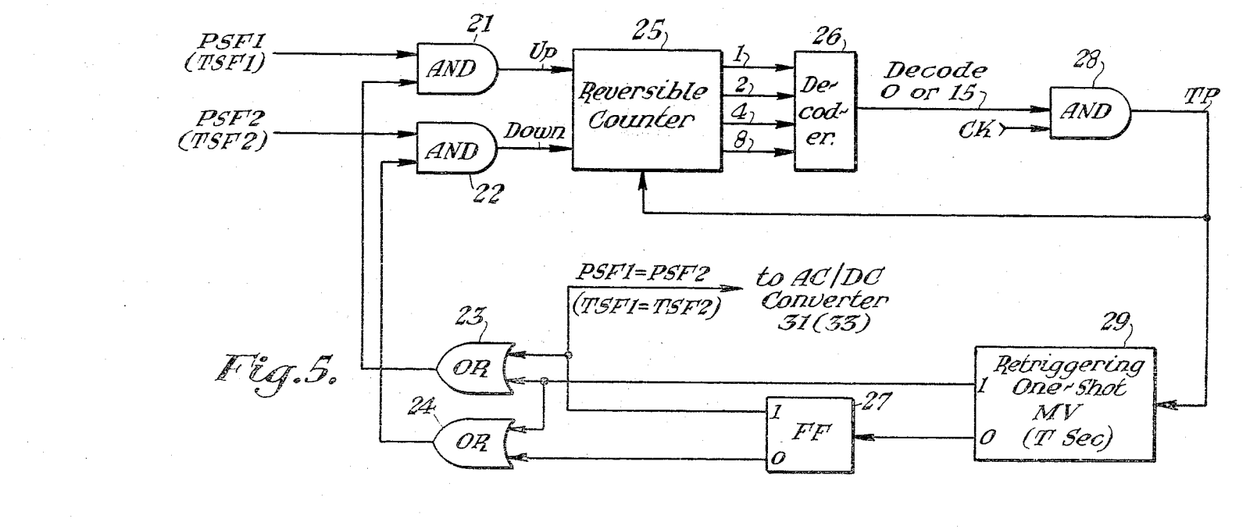

A detailed block diagram is shown in FIG. 5 of the cycle check controller 20 which functions to recognize whether the two individually generated allowed speed frequencies PSF1 and PSF2 are equal. The arrangement indicates the equality of these two signals by outputing an oscillating signal, designated as PSF1=PSF2. This oscillating output signal is created only when a periodic check within the cycle check controller assures that the arrangement can detect when one input signal is alternately simulated higher or lower in frequency than the other input signal. The four-stage reversible counter 25 receives a reset trigger impulse TP and the pulsed outputs from AND gates 21 and 22. Counter 25 develops, from these inputs, a number from 0 through 15 in binary rotation and outputs the result into a decoder unit 26. This unit, upon receipt of such inputs, determines whether the number is 0 or 15 and indicates the detection of either of these two limit states of the counter by outputing a signal which enables AND gate 28 to generate the trigger pulse TP by passing the clock frequency CK from oscillator 4. This trigger pulse TP, when applied to counter 25, resets the counter to a count of 8 when the negative or trailing edge of the pulse occurs. Additional trigger pulses are not generated since AND gate 28 is immediately disabled by a low output from decoder 26 since the count is no longer 0 or 15. The trailing edge of each pulse TP also activates or fires a retriggerable one-shot multivibrator unit 29 for a period having a duration of T seconds. When unit 29 is fired, the negative going signal from its 0 output applied to the flip-flop unit 27 causes this latter unit to immediately change state. The AND gates 21 and 22 pass the permitted or allowed speed frequencies PSF1 and PSF2, respectively, when the OR gates 23 and 24 are activated by an output from either flip-flop 27 or one-shot unit 29.

Thus when a trigger pulse TP occurs, one-shot unit 29, through the OR gates, enables AND gates 21 and 22 for a period of T seconds, allowing them to pass the allowed speed frequencies PSF1 and PSF2 which, respectively, increment and decrement counter 25 from its count of 8. If these input frequencies are not equal, more pulses will occur at one input than at the other of counter 25 and the counter steps to either of its extreme counts 0 or 15 before the T second period has expired. When this occurs, a second trigger pulse TP sets the counter to position 8 and retriggers one-shot unit 29. As long as the input signals are not equal, flip-flop 27 is not switched since its clock or activating input is held constant by the continuously triggered condition of one-shot unit 29. Thus, the output line PSF1=PSF2 from the 1 state output terminal of the flip-flop remains at either a high or low level, depending upon the state of the flip-flop before the unequal frequency condition occurred. Thus, an oscillating signal output from the cycle check controller is not produced.

If the input frequencies PSF1 and PSF2 are equal, the count within counter 25 oscillates around the count 8 since an equal number of count up and count down pulses occur. After the period of T seconds, when the counter has not reached either its 0 or 15 state, a trigger pulse TP is not generated and unit 29 returns to its nonactivated state. If flip-flop 27 is in its 1 state, the counter continues to receive the count up frequency PSF1, since only OR gate 23 remains actuated to enable AND gate 21. Counter 25 then rapidly reaches a maximum count 15 which causes a trigger pulse TP to be generated. The counter is reset to a count of 8 and one-shot unit 29 is triggered which switches flip-flop 27. The counter will now be pulsed both up and down since both AND gates are enabled. However, at the end of the period of T seconds, the counter will not have moved to either extreme position 0 or 15, and a new timing pulse is not generated, since no TP pulse occurs to retrigger one-shot multivibrator 29. Since flip-flop 27 has changed state, it now enables only OR gate 24 which in turn enables AND gate 22 so that only count down pulses of frequency PSF2 are applied to counter 25 which rapidly decrements to a count of 0. When the 0 count is reached, both inputs to the counter again are enabled since the output from decoder 26 through AND gate 28 enables a triggering pulse and the cycle repeats. The switching of flip-flop 27 every T seconds provides the 2T cycle square wave required to produce the output PSF1=PSF2 which, through AC/DC converter 31 of FIG. 1, retains energized relay PSFC.

Cycle check controller 30, which compares the equality of the actual speed signals TSF1 and TSF2, is identical in construction to the arrangement shown in FIG. 5. The inputs TSF1 and TSF2 are applied, as shown in parentheses, each to one of the inputs of AND gates 21 and 22, respectively. If equality is determined, the output signal TSF1=TSF2 is produced at the 1 state output of flip-flop 27. This oscillating signal, applied through AC/DC converter 33, is then sufficient to hold relay TSFC energized.

The arrangement of my invention thus provides a digital speed control apparatus for vehicles or trains which receive a desired or allowed speed signal from an external source. The actual speed signal for comparison is determined on-board the vehicle or train. The apparatus includes a check for the validity of the allowed and actual speed frequency signals which are generated or converted from the originally received external and self-generated signals. The apparatus for comparing the actual and allowed speed signals to determine under and over speed conditions of the vehicle also periodically simulates an overspeed condition to check the alidity of the produced output which occurs when and only when an underspeed condition exists. The final speed or propulsion and braking control of the vehicle then checks that not only does an underspeed condition exist but that the converters producing the speed proportional frequency signals are properly operating and the speed signals being compared are thus valid. The overall result is an efficient, effective, and fail-safe digital speed control arrangement for vehicles and trains operating along fixed roadways.

Although I have herein shown and described but a single arrangement embodying the features of my invention, it is to be understood that various changes and modifications may be made therein within the scope of the appended claims without departing from the spirit and scope of my invention.

Having thus described my invention, what I claim is:

1. A speed control arrangement for a vehicle moving along a right-of-way, comprising in combination,
   a. receiver means coupled for receiving an allowed speed command from an external control source and responsive thereto for producing a frequency signal representative of said allowed speed,
   b. first frequency converter means having dual conversion channels, each channel connected for receiving said allowed speed signal and operable for converting that signal into a first frequency proportional to said allowed speed and normally equal to the corresponding first frequency produced by the other associated dual channel,
   c. speed measuring apparatus controlled by said vehicle for producing a signal having a frequency characteristic representative of actual vehicle speed,
   d. second frequency converter means having dual conversion channels, each channel connected to receive said actual speed signal and operable for converting the frequency characteristic into a second frequency proportional to actual vehicle speed and normally equal to the corresponding second frequency produced by the other associated dual channel,
   e. comparator means coupled to both said frequency converter means for comparing one frequency signal proportional to each of the allowed and actual vehicle speeds, and producing an output signal having a characteristic selected in accordance with the comparison results,
   f. movement control means for said vehicle coupled to said comparator means for registering said output signal and responsive thereto for controlling the movement of said vehicle in accordance with the signal characteristic, and
   g. a conversion checking means coupled to each converter means for comparing the equality of the frequencies of the two corresponding output signals, each checking means coupled to said movement control means for inhibiting movement of said vehicle if unequal frequencies are detected.

2. A speed control arrangement as defined in claim 1 in which,
   a. said output signal from said comparator means has a first or a second characteristic as said second frequency is lower than or higher than said first frequency, respectively, and
   b. said movement control means is responsive to said first signal characteristic to allow continued movement of said vehicle and to said second signal characteristic to reduce the actual speed at least below the overspeed condition.

3. A speed control arrangement as defined in claim 2 in which,
   a. said movement control means is a brake valve magnet connected for actuating an automatic application of the vehicle brakes when said magnet is deenergized,
   b. said comparator means is coupled for holding said valve magnet energized when the output signal has said first characteristic, and
   c. said second signal characteristic is the absence of an output signal to deenergize said valve magnet.

4. A speed control arrangement as defined in claim 3 in which,
   a. each conversion checking means further provides a selected output signal only when the corresponding pair of frequency signals are identical,
   b. each checking means also being coupled for deenergizing said valve magnet when unequal frequencies are detected.

5. Speed control apparatus for a railroad train, comprising in combination,
   a. receiver means coupled for receiving an allowed speed command from an external control source and responsive thereto for producing a frequency signal representative of said allowed speed,
   b. a first frequency converter means having two conversion channels, each channel connected for receiving said allowed speed signal and operable for converting the frequency of that received signal into a separate first frequency signal proportional to said allowed speed, both converted signals normally having identical frequencies, c. speed measuring apparatus controlled by said train for producing a signal having a frequency characteristic representative of actual train speed, d. a second frequency converter means having two conversion channels, each channel connected for receiving said actual speed signal and operable for converting the frequency characteristic of the received signal into a separate second frequency signal proportional to said actual speed, both converted signals normally having identical frequencies, e. speed controller means coupled for comparing one each of said first and second frequency signals to produce an output having a preselected characteristic only when said second frequency is lower than said first frequency, f. propulsion control means coupled for registering said preselected characteristic of said output signal from said controller means to enable train movement to continue, said propulsion control means further responsive to the absence of said preselected characteristic for reducing the speed of said train at least below an overspeed condition, g. a first check controller means coupled for receiving both first frequency signals and operable for comparing the two signal inputs to produce an output signal only when both input signals have an identical frequency, and h. a second check controller means coupled for receiving both second frequency signals and operable for comparing the two signal inputs to produce an output signal only when both input signals have an identical frequency, i. each said check controller means further coupled for inhibiting the response of said propulsion control means to the output of said speed controller means when the two corresponding signal inputs have different frequencies.

6. Speed control apparatus as defined in claim 5 in which said speed controller means comprises, a. a reversible counter means with up and down count inputs and predetermined upper and lower count limits, b. a decoding means coupled for separately detecting when said counter means reaches upper and lower count limits, c. up and down input gates connected to said counter means for coupling said first and said second frequency signals to the up and down count inputs, respectively, 1. both said gates controlled by said decoding means for inhibiting the corresponding signal input when the upper and lower count limit is detectred, respectively and d. timing means operable to provide a first and a second timing period after an initial activation, said second period being of shorter length than and part of only an initial first timing period, 1. said timing means controlled by said decoding means for activating said first timing period each time the lower count limit is detected, 2. said timing means connected for enabling said up input gate only when said first timing period is running, e. said timing means producing an output during said second timing period, successive outputs occurring at said first timing period frequency generating said output signal having said preselected characteristic.

7. Speed control apparatus as defined in claim 6 in which said first and second check controller means each comprise, a. a reversible counter means with up and down count inputs, a reset input, and predetermined upper and lower count limits, b. a decoding means coupled for detecting when said counter means reaches either count limit, c. up and down input gates connected to said counter means for coupling one of the corresponding pair of frequency signals to each count input, d. timing means operable to provide a predetermined timing period after each activation and to supply an output during that timing period, e. a gating means controlled by said decoding means for passing a trigger pulse when an upper or lower limit count is detected and connected for applying said trigger pulse to activate said timing means and to reset said counter means to a preselected intermediate count level, f. a bistable device controlled by said timing means for changing state upon each initial activation of said timing means to begin a new timing period following a nonactive period, and g. coupling means connected for applying said output of said timing means to enable both said input gates to apply both corresponding frequency signals to said counter means, h. said coupling means also connected for applying outputs from said bistable device to enable said up or down input gate in accordance as said bistable device is in its first or second state, respectively, and said timing means is not activated.

8. Speed control apparatus as defined in claim 7 in which said second frequency converter means also includes, a. wheel wear adjustment means operable to preset a wheel wear condition index in accordance with the amount of wear of the train wheels between maximum and minimum sizes, b. said adjustment means connected to both signal conversion channels for varying the conversion factor for said actual speed signal to produce a second frequency more accurately proportional to actual train speed.

* * * * *